United States Patent [19]

Strauss

[11] 4,104,656
[45] Aug. 1, 1978

[54] CONTROL MEANS FOR A DIAPHRAGM OF A SINGLE LENS REFLEX CAMERA

[75] Inventor: Karl-Peter Strauss, Volkmarode, Germany

[73] Assignee: Rollei-Werke Franke & Heidecke, Braunschweig, Germany

[21] Appl. No.: 733,770

[22] Filed: Oct. 19, 1976

Related U.S. Application Data

[63] Continuation-in-part of Ser. No. 594,466, Jul. 9, 1975, abandoned, which is a continuation of Ser. No. 467,754, May 7, 1974, abandoned.

[30] Foreign Application Priority Data

May 5, 1973 [DE] Fed. Rep. of Germany ....... 2322747
Feb. 16, 1974 [DE] Fed. Rep. of Germany ....... 2407600

[51] Int. Cl.$^2$ .............................................. G03B 7/08
[52] U.S. Cl. ........................................ 354/43; 354/41; 354/42; 354/44; 354/60 A; 352/141
[58] Field of Search ................. 354/40, 41, 42, 43, 354/44, 45, 60 R, 60 A, 23 D; 352/141

[56] References Cited

U.S. PATENT DOCUMENTS

| | | |
|---|---|---|
| 3,427,941 | 2/1969 | Metzger .................... 354/43 |
| 3,605,001 | 9/1971 | Miyakawa ................. 354/43 |
| 3,611,894 | 10/1971 | Minneste, Jr. .............. 354/43 |
| 3,709,137 | 1/1973 | Starp ........................ 354/45 |
| 3,813,680 | 5/1974 | Wagensonner ............ 354/44 |
| 3,972,607 | 8/1976 | Reider ..................... 352/141 |

Primary Examiner—Russell E. Adams
Attorney, Agent, or Firm—Stonebraker, Shepard & Stephens

[57] ABSTRACT

Electronic means for controlling the aperture of an electromagnetically operated diaphragm of a photographic camera, especially a single lens mirror reflex camera. The diaphragm aperture is set by a pot-shaped electromagnet. The coil of the electromagnet is supplied with current by an electronic circuit which responds to light falling on a photoelectric converter placed behind the diaphragm, which compares the value of this response to a nominal value resulting from a shutter speed setting and a film speed or sensivity setting, and transmits current in a rapid series of pulses to the coil of the magnet which operates the diaphragm. The pulsing nature of the current applied to the electromagnet tends to cause a slight vibration in the mechanical parts of the diaphragm mechanism, and this vibration helps to overcome the static friction of the moving parts of the diaphragm mechanism, facilitating the setting of the diaphragm to the exact value desired.

24 Claims, 4 Drawing Figures

CONTROL MEANS FOR A DIAPHRAGM OF A SINGLE LENS REFLEX CAMERA

CROSS REFERENCE TO RELATED APPLICATION

This application is a continuation-in-part of my application Ser. No. 594,466, filed July 9, 1975, which is a continuation of my application Ser. No. 467,754, filed May 7, 1974 and now both abandoned.

BACKGROUND OF THE INVENTION

It is known in the art to use a pot-shaped electromagnet for driving the blades of a photographic shutter (Mielke U.S. Pat. No. 3,724,350, granted Apr. 3, 1973) and for adjusting the leaves of an iris diaphragm (Mielke U.S. Pat. No. 3,812,501, granted May 21, 1974). The present invention is in the nature of an improvement in the means for providing electric current to drive the electromagnet, particularly when the electromagnet is used for adjusting a diaphragm rather than for driving shutter blades.

When the diaphragm of the camera is adjusted by means of an electromagnet, a convenient way to make such adjustment automatic in accordance with prevailing light conditions is to have the light fall on a photo-converter or photocell electrically connected to the circuit of the electromagnet. The photo-converter may be placed behind the diaphragm, receiving its light through the diaphragm, so that as the diaphragm closes down, less light is received by the photo-converter, and as the diaphragm opens wider, more light is received. This arrangement is particularly suitable for use in a single lens mirror reflex camera. Examples of arrangements where the light coming through the diaphragm falls upon a photo-converter behind the diaphragm, are disclosed in the present applicant's U.S. Pat. No. 3,792,485, granted Feb. 12, 1974, and the present applicant's copending application, Ser. No. 667,596, filed Mar. 17, 1976 as a continuation of Ser. No. 539,379, filed Jan. 8, 1975, which was a continuation of Ser. No. 410,251, filed Oct. 26, 1973.

In a known form of single lens mirror reflex camera of this general kind, the diaphragm driving ring is connected to the plunger coil of the pot-shaped magnet, approximately in the manner disclosed in the above mentioned U.S. Pat. No. 3,812,501. A photoelectric converter situated behind the diaphragm and receiving light through the diaphragm supplies an exciter current, independent of the exposure, to the plunger coil of the pot-shaped magnet. The coil enters into or emerges from the pot-shaped magnet, according to the direction in which the current flows. The distance to which it enters or emerges depends on the magnitude of the exciter current, so that by regulating the exciter current, the diaphragm can be set to a certain aperture. The exciter current is regulated by means of an exposure regulator which measures the light passing through the diaphragm aperture and falling on the photoelectric converter, and compares this value with a nominal value, and conveys an appropriate exciter current to the plunger coil, through a power amplifier.

In addition to the power loss involved in the power amplifier, the main disadvantage of this method of actuating the diaphragm is that, in the vicinity of the balancing point of the diaphragm, the plunger coil is provided with only a very low exciter current, its controlling force thus being very limited. In many cases this low controlling force is insufficient to overcome the mechanical static friction of the diaphragm adjusting system, so that the diaphragm does not move through slight adjusting movements that should take place, and a slight deviation from the theoretically correct diaphragm aperture will prevail.

A further difficulty with the prior arrangement is the problem of braking the movement of the diaphragm mechanism when the correct diaphragm setting is reached, to prevent the diaphragm from overshooting or of oscillating about its balancing point.

An object of the present invention is to provide a diaphragm drive control system which will insure a very accurate diaphragm setting, even with the use of a very limited controlling force.

Another object is the provision of such a diaphragm drive control system which is particularly satisfactory and trustworthy when making slight adjustments in the vicinity of the balancing point.

Still another object is the provision of a diaphragm drive control system so designed that during the adjusting movement, the moving parts approach the theoretically correct setting asymptotically.

A further object is the provision of a diaphragm drive control system so designed that the heat developed in the amplifier stage of the exciter current is reduced to a minimum.

SUMMARY OF THE INVENTION

The above mentioned objects are achieved as a result of the fact that the diaphragm drive, according to the present invention, is digitally controlled. Preferably the exciter current applied to the coil of the electromagnet consists of a train or series of current impulses, the scanning ratio of the pulse train being adjustable by means of a signal taken from the photoelectric converter. This system offers the advantage that the controlling force of the diaphragm drive is comparatively high, even in the vicinity of the balancing point. It has the further advantage that the control of the drive by a series of short pulses causes a slight vibration in the mechanical system, not sufficient to be detrimental, but very helpful in almost completely nullifying the mechanical static friction of the mechanical parts. This enables accurate adjustment of the diaphragm even when it deviates only very slightly from the exact balancing point to which it should be adjusted.

In one advantageous development of the invention, the pulse train consists of alternating positive and negative current impulses, the pulse frequency being greater than the response speed of the diaphragm drive. If the total duration of the individual positive impulses is greater than that of the negative impulses, or vice versa, as a result of the photoelectric signal coming from the converter and modulated into the pulses, the diaphragm drive will adjust itself in the direction of opening the diaphragm aperture or closing down the aperture, respectively, until the positive and negative impulses prevail for an equal time. When equality of the positive and negative impulses is achieved, the adjusting forces cancel themselves out, and the diaphragm drive comes to a stop in the desired position. In order not to subject the battery to an unnecessary load in the vicinity of the balancing point, special means have to be provided for disconnection of the diaphragm drive from the supply battery.

In order to dispense with these separate devices, the pulse train, in a further embodiment of the invention, has current impulses of the same polarity, determined by the direction of the approach of the balancing point. If, for example, the prevailing light conditions require that the diaphragm aperture be reduced from its then existing size to a smaller size, the pulse train will be confined to impulses of negative polarity. On the other hand, if the diaphragm aperture has to be increased, then the diaphragm drive will be fed with an energy current or exciter current containing only positive current impulses. The duration of individual current impulses will vary according to the extent of movement necessary to bring the diaphragm from its then existing setting to the aperture required in view of prevailing light conditions. The smaller the difference between the actual setting at the moment, and the nominal or desired setting required by light conditions, the shorter will be the individual adjustment impulses. At the balancing point, the exciter current of the diaphragm drive is zero.

According to the invention, both types of impulse control for the diaphragm drive can be obtained as a result of the fact that the diaphragm drive is connected with a control stage actuated by an impulse width modulator. This modulator is coupled to an impulse generator and a comparator. The inputs thereof are connected with the photoelectric converter and with a nominal value setter.

In order to actuate the diaphragm drive with a pulse train of alternating positive and negative current impulses, use is made advantageously of an operation amplifier, the output of which is connected with the control stage for the diaphragm drive and also with its respective inputs, in each case via a resistor, a capacitor being connected between the inverting input of the operation amplifier and a reference potential prevailing between the upper and lower potential of the supply voltage of the operation amplifier. The inputs of the amplifier are connected with the photoelectric converter and with a nominal value setter. A power amplifier is preferably interposed between the photoelectric converter and the operation amplifier.

On the other hand, when the diaphragm drive is to be actuated with a pulse train consisting of current impulses of the same polarity rather than alternating polarity, it is advantageous to use a control stage comprising two transistors, for the diaphragm drive, and an operation amplifier having an output connected with the control electrodes of the transistors and also connected, via a capacitor which can be periodically short-circuited, with the inverting input of the operation amplifier. The inputs of the amplifier are connected to the photoelectric converter and to a nominal value setter. In this case it is advantageous to bridge the capacitor by means of a transistor actuated by an impulse generator.

In order to prevent the diaphragm drive from overshooting at the balancing point, which would again necessitate a counter control of the drive, the invention also includes the use of a measuring element which measures the speed of the diaphragm drive and which renders the diaphragm drive inoperative a suitable time before the balancing point is reached, so that the drive only continues to the balancing point under its own momentum or impetus, approaching it asymptotically, either before or after a slight overshooting. This is achieved, according to a further development of the invention, as a result of the fact that the voltage difference prevailing at the inputs of the operation amplifier is reduced by means of an element which, during the balancing operation, integrates the output voltage of the operation amplifier. For this purpose, an RC element or member is connected between the output of the operation amplifier and a reference potential prevailing between the upper and lower potential of the supply voltage of the amplifier. The connecting point between the resistor and the capacitor of this RC member is connected to the inverting input of the amplifier.

To insure that the integration of the output voltage of the operation amplifier will not take place until the moment at which the technilogically determined threshold value of the transistors of the diaphragm drive control stage has been reached (the transistors becoming conductive at this threshold voltage), two diodes connected in parallel in opposite directions are provided between the output of the operation amplifier and the capacitor of the RC member. In order to conduct current, these diodes require a certain minimum voltage, corresponding to the threshold voltage of the transistors. Thus the diodes and the transistors become conductive at the same moment. A resistor is connected in parallel with the capacitor of the RC member, in order to discharge this capacitor. The RC member and the resistor are dimensioned to insure that the discharge voltage of the capacitor will change in proportion to the increase or decrease undergone by the kinetic energy of the diaphragm drive system.

DESCRIPTION OF THE PREFERRED EMBODIMENTS

Figure 1:
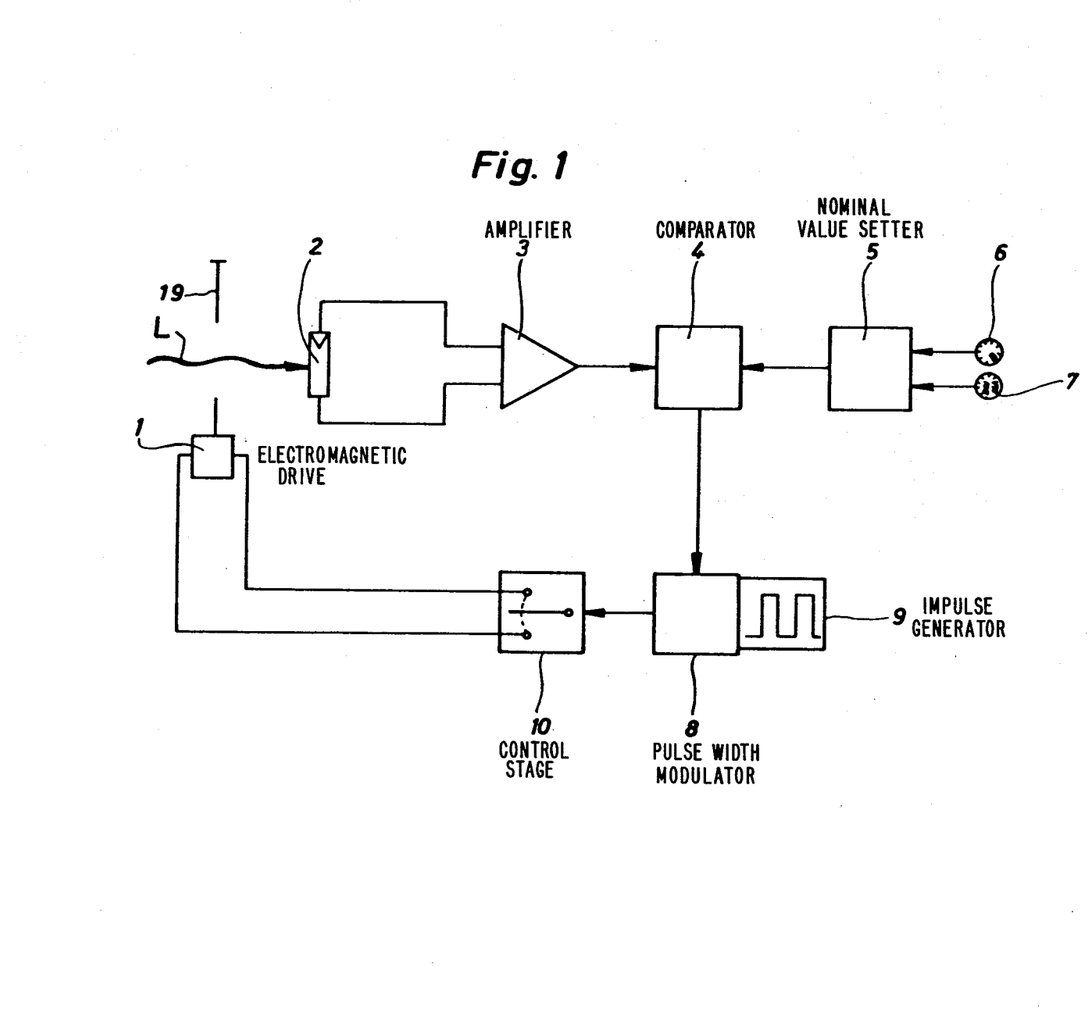
FIG. 1 is a schematic block diagram of an exposure regulator for a single lens mirror reflex camera, according to the present invention.

Referring now to FIG. 1, this shows schematically the electrical features of the diaphragm drive. The camera itself, other than the electrical features of the diaphragm drive, is of conventional and well known construction, and therefore is not illustrated. It contains, of course, the usual camera body or housing, with lens, and shutter (which may be either an objective shutter or a focal plane shutter) and means for holding the film in position to be exposed. Also, if the camera is of the single lens mirror reflex type, the camera body contains the usual conventional pivoted or swinging reflex mirror. Although the present invention is especially adapted to use with single lens mirror reflex cameras, it is not limited in its usefulness to this type of camera, and may be used with other types of camera also.

Associated with the camera lens (not shown, as above stated) is the adjustable diaphragm, usually but not necessarily of the iris type, indicated schematically at 19. The diaphragm is adjusted to its various different aperture positions by the electromagnetic diaphragm drive indicated schematically at 1. This drive preferably includes what may be called a linear electric motor, such as the pot-shapted electromagnet shown in the above mentioned Mielke U.S. Pat. No. 3,724,350 (although there disclosed in connection with a shutter rather than a diaphragm) or the above mentioned Mielke U.S. Pat. No. 3,812,501 (there disclosed in connection with a diaphragm).

Light entering through the lens and the diaphragm, in the direction of the arrow L, reaches the photoelectric converter 2 located behind the diaphragm. The converter 2 is electrically connected via an amplifier 3 with a comparator 4. This comparator 4 is also subjected to the action of a nominal value setter 5, the nominal value of which is set in response to a manually settable exposure time (shutter speed) setting member 6 and manually settable film sensitivity (film speed) setting member 7, of conventional construction.

The comparator 4 has an output connected to a pulse width modulator 8 which is subjected to a pulse train of a certain frequency by an impulse generator 9, also of conventional construction. The output of the pulse width modulator 8 goes to a control stage 10 which is connected to the electromagnetic diaphragm drive 1 in such a way that when the control stage is in one control position, the exciter current passes through the coil of the electromagnetic diaphragm drive in one direction, and when the control stage is in the other control position, the exciter current passes through the coil in the opposite direction.

This circuit operates as follows:

To make the camera ready for an exposure, the shutter speed (exposure duration) selected by the photographer is manually set on the shutter speed setter 6, and the sensitivity or speed of the film being used in the camera is manually set on the setter 7. These settings produce a certain reference value or nominal value in the setter 5, connected to one of the inputs of the comparator 4. The light L coming through the diaphragm 19 and falling upon the photoelectric converter 2 produces an electrical signal which, through the amplifier 3, is delivered to another input of the comparator 4. The comparator 4 compares the light value coming from the converter 2 and amplifier 3 with the nominal value coming from the setter 5. At the output of the comparator 4, a signal is formed which depends on the magnitude of the difference between the nominal value coming from the setter 5 and the light value or luminous density coming from the converter 2 through the amplifier 3. This signal is conveyed to the pulse width modulator 8.

This pulse width modulator 8 is also supplied by the impulse generator 9 with a pulse train of a certain frequency. In the impulse modulator 8, the signal coming from the output of the comparator 4 is modulated onto the pulse train, in which process the scanning ratio of the pulse train is altered in accordance with the magnitude of the signal coming from the comparator 4.

Impulses of different duration may be taken from the output of the pulse width modulator 8, and are conveyed to the control stage 10 of the diaphragm drive. The control stage switches over into one control position or the other, according to the polarity of the impulses, so that the diaphragm is adjusted accordingly, either upwards or downwards, that is, either to increase the aperture or to decrease the aperture, until a balancing point is reached wherein the signal coming to the comparator 4 from the nominal value setter 5 is equal to the signal from the photoelectric converter 2 via the amplifier 3. As the diaphragm 19 closes down, less light reaches the photoelectric converter 2, so the signal coming to the comparator 4 from this direction decreases, and as the diaphragm 19 opens up to a larger aperture, more light falls on the converter 2 and the signal from this source to the comparator 4 increases. As above indicated, a point is reached where the two signals coming to the inputs of the comparator 4 are equal, and it is at this point that the diaphragm is set to the proper aperture for optimum results in making the intended photographic exposure.

Figure 2:
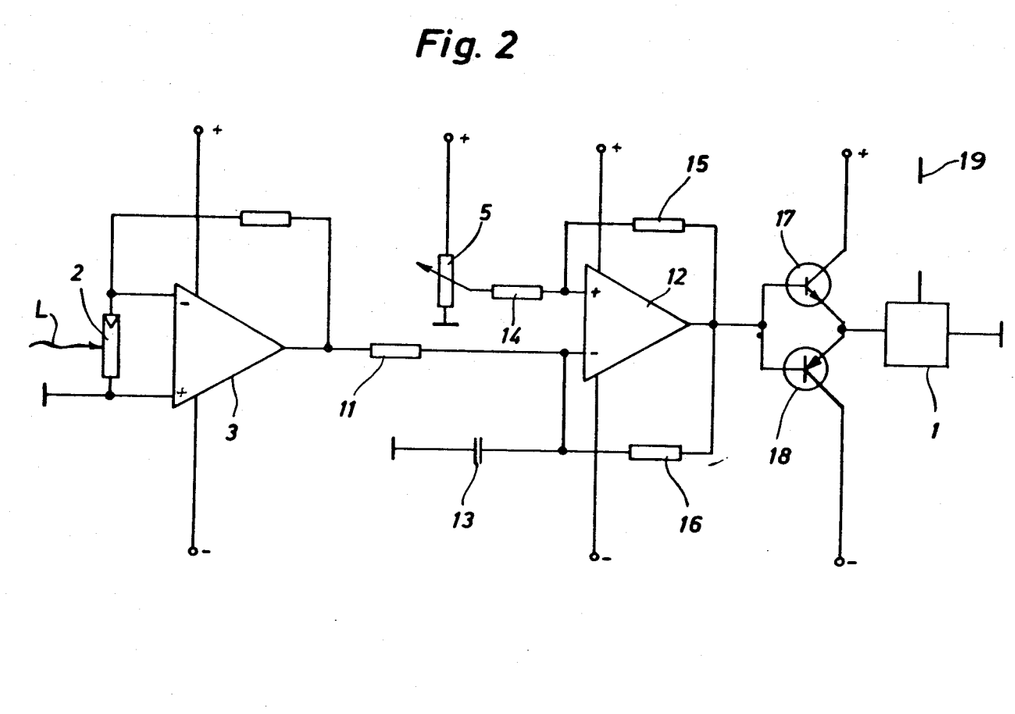
FIG. 2 is a schematic block diagram of one technical version of the exposure regulator shown in FIG. 1, illustrating additional details, this diaphragm drive being actuated by means of a succession of alternating positive and negative current impulses.

FIG. 2 shows additional details of one embodiment of apparatus of the general form above described with reference to FIG. 1. In FIG. 2, the diaphragm is indicated, as before, at 19, and the diaphragm drive (pot-shaped electromagnet, etc.) is shown schematically at 1. The photoelectric converter 2 receives light, as before, through the diaphragm. For the sake of a more convenient and simplified wiring diagram, the diaphragm 19 and its drive 1 are shown at one end of the wiring diagram, and the photo-converter 2 is shown at the opposite end of the diagram, but the physical location of the photoelectric converter is actually behind the diaphragm, so that it receives light only through the diaphragm, as already explained.

As before, the converter 2 feeds its signal to the amplifier 3, the output of which is connected through a series resistance 11 with the inverting input (minus input) of an operation amplifier or comparator 12. A capacitor 13 is connected between the inverting input and a reference potential prevailing between the upper and lower (plus and minus) potential of the supply voltage.

The non-inverting input (plus input) of the operation amplifier 12 is connected through a series resistance 14 with the nominal value setter 5. As previously indicated in connection with FIG. 1, this nominal value setter 5 preferably has provision for setting a selected shutter speed or exposure time interval, and also a film speed or film sensitivity value, but for the sake of simplicity, these separate setting elements are omitted in FIG. 2.

Both the non-inverting input and the inverting input of the operation amplifier 12 are connected through resistors 15 and 16, respectively, to the output of the operation amplifier. This output is also connected with what may be called a control stage, comprising a series connection of an NPN transistor 17 and a PNP transistor 18. The collector of the transistor 17 is connected with the positive pole of the supply voltage; the collector of the transistor 18 is connected with the negative pole of the supply voltage; and the bases of both transistors are connected to each other and to the output of the operation amplifier 12. The emitters of both transistors are connected to each other and to the diaphragm drive 1, which drive is also connected to the above mentioned intermediate reference potential. According to whether the current in the diaphragm drive flows from the positive pole through the transistor 17 to the reference potential, or from the reference potential through the transistor 18 to the negative pole of the supply voltage, the diaphragm drive will move in the direction for opening or for closing the diaphragm aperture, as the case may be.

This circuit arrangement operates as follows: when light passes through the opened diaphragm 19 and reaches the photoelectric converter 2, the voltage produced thereby is amplified by the amplifier 3. This voltage is supplied through the series resistor 11 to the inverting input (minus input) of the operation amplifier 12. At the same time, the non-inverting or plus input of the operation amplifier 12 is positively biased through the series resistor 14 and the nominal value setter 5, the extent of this biased depending on the set values of the film sensitivity and the shutter speed previously selected by the operator.

As long as the voltage at the inverting input of the operation amplifier 12 is lower than the voltage at the non-inverting input, the voltage at the output of this operation amplifier is positive, and the capacitor 13 is charged up positively, through the resistor 16. However, as soon as the voltage prevailing at the inverting input of the operation amplifier 12 (this voltage being made up of the signal voltage from the output of the amplifier 3 and the charging voltage of the capacitor 13) is higher than the voltage at the non-inverting input of the operation amplifier 12 (which voltage is determined by the nominal value setter 5) then the voltage at the output of the operation amplifier 12 triggers over and becomes negative. As a result, the capacitor 13 discharges itself across the resistor 16. As soon as the voltage at the inverting input of the operation amplifier 12 becomes lower than the required voltage at the other input of this amplifier, owing to the discharge of the capacitor 13, the voltage at the output of the operation amplifier or comparator 12 triggers over once more, and becomes positive.

This process is repeated in rapid succession, resulting in a self-oscillating system. When the output voltage of the operation amplifier 12 is positive, the control transistor 17 is driven hard, and when the output voltage of the amplifier 12 is negative, the control transistor 18 is driven hard. The diaphragm drive 1 is thus subjected to a positive and a negative voltage in rapid alternation, so that the direction taken by the exciter current flowing in the coil of the electromagnet is continually reversed. According to which of the two voltages prevails longer, per unit of time, the coil of the electromagnet moves in one direction or the other, and the diaphragm aperture is accordingly increased or decreased, as the case may be.

According to the magnitude of the voltage difference at the two inputs of the operation amplifier 12, caused by the signal coming from the photoelectric converter 2, the scanning ratio of the pulse train will be modulated or altered. This scanning ratio is to be interpreted as the quotient of the positive and the negative impulse duration throughout one period of the said pulse train.

In the balancing operation, that is, when the diaphragm is correctly adjusted, the output of the operation amplifier 12 is subjected alternately to a positive and a negative voltage of equal duration. The scanning ratio has the value 1. As the change from positive to negative voltage, and thus from positive to negative actuation of the diaphragm drive, takes place very rapidly, the diaphragm drive is prevented by its mass inertia from following this change, and remains at the balancing point. This results in a slight vibration of the system, of such a small extent that it does not interfere in any way with the quality of the picture taken by the camera, but sufficient so that it almost completely eliminates the mechanical static friction of the separate moving mechanical elements, thus enabling the diaphragm to be accurately adjusted, even with the relatively low controlling force which seeks to adjust the diaphragm aperture slightly when it is already in the vicinity of the balancing point.

Owing to the use of a control stage taking the form of transistors 17 and 18, the power loss of the system is mainly confined to the exciter system of the diaphragm drive. The heat which develops can be easily dissipated in that position.

Figure 3:
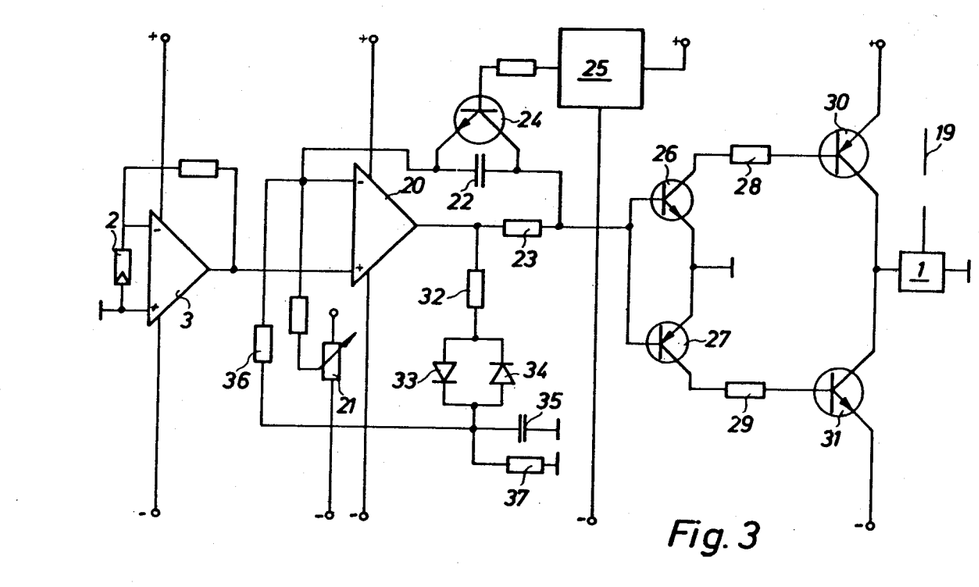
FIG. 3 is a schematic diagram of another embodiment of the invention according to FIG. 1, the diaphragm drive in this embodiment being actuated by means of a pulse train of current impulses of the same polarity.

FIG. 3 illustrates detail of a second specific embodiment of the invention, still in accordance with the basic generic form of the invention described in connection with FIG. 1. In this embodiment of FIG. 3, the diaphragm is indicated schematically at 19 and its drive indicated at 1. The photoelectric converter 2 is physically located behind the diaphragm and receives light through the diaphragm. The signal derived from the photoelectric converter 2 is amplified by the amplifier 3 and delivered to the non-inverting or plus input of the operation amplifier or comparator 20. The inverting or minus input of this operation amplifier is connected to the nominal value setter 21 which, as previously mentioned, has provision for setting the film speed or sensitivity and also the selected shutter speed. It will be noted that these connections are reversed as compared with the embodiment of FIG. 2, where the signal from the photoelectric converter is delivered to the inverting input rather than the non-inverting input of the operation amplifier, and the nominal value setter is connected to the non-inverting input rather than the inverting input as in the present case.

The inverting input of the operation amplifier 20 is also connected, through a capacitor 22 and a resistor 23, to the output of the operation amplifier, as illustrated in the wiring diagram. The capacitor 22 is bridged by the collector-emitter section of an NPN transistor 24 in parallel with this capacitor, the base of the transistor being connected through a capacitor to an impulse generator 25 of conventional known construction. The impulse generator is also connected to the positive and negative terminals of the voltage supply, as illustrated. The impulse generator may be of any suitable known form. The construction and operation of an impulse generator suitable for purposes of the present invention are disclosed in copending application Ser. No. 442,261 filed Feb. 13, 1974 by the present applicant and Wilhelm Koller as joint inventors, now U.S. Pat. No. 3,842,587, granted Oct. 22, 1974.

The output of the operation amplifier 20 is connected, through the above mentioned resistor 23, to the base sections of an NPN transistor 26 and a PNP transistor 27. The collectors of the two transistors are connected, through resistors 28 and 29, respectively, to the bases of the respective PNP transistor 30 and NPN transistor 31. The emitter of the transistor 30 is connected to the positive pole of the voltage source, and the emitter of the transistor 31 is connected to the negative pole of the voltage source. The collectors of both of these transistors 30 and 31 are connected to each other and to the diaphragm drive 1, which is also connected to a reference potential prevailing between the upper (positive) and lower (negative) potential of the supply voltage. The emitters of the two transistors 26 and 27 are connected to each other and also to this same reference potential.

With this arrangement, when the transistor 30 is conductive and the transistor 31 is non-conductive, current will flow from the positive pole of the voltage source through the transistor 30 and through the electromagnetic coil in the diaphragm drive 1, to the intermediate reference potential. When the transistor 30 is non-conductive and the transistor 31 is conductive, current will flow in the opposite direction from the intermediate reference potential through the coil of the electromagnet in the diaphragm drive and through the transistor 31 to the negative terminal of the voltage source.

A series circuit having a resistor 32, two diodes 33 and 34 connected in parallel with each other and in opposite directions, and a capacitor 35, is connected between the output of the operation amplifier 20, and the above mentioned reference potential. The connecting point between the diodes and the capacitor 35 is connected through a resistor 36 to the inverting input of the operation amplifier 20. For discharging the capacitor 35, a resistor 37 is connected in parallel therewith. This resistor is dimensioned to insure that the voltage of the capacitor 35 decreases in the same manner as the kinetic energy of the diaphragm drive system.

The circuit arrangement schematically illustrated in FIG. 3 operates as follows: when light falls on the photoelectric converter 2, the voltage at the output of the amplifier 3 is correspondingly increased by the amplifier. This voltage reaches the non-inverting input of the operation amplifier or comparator 20, and the preselected nominal voltage from the setter 21 reaches the inverting input of this same amplifier. If the voltage at the non-inverting input exceeds the voltage at the inverting input, then a voltage which is positive with respect to the intermediate reference potential will occur at the output of the operation amplifier 20.

Owing to the capacitative feedback of the output of the operation amplifier with its inverting input, through the capacitor 22, this voltage gradually increases from the reference potential. After a certain period, determined by the frequency at which pulses are being generated by the impulse generator 25, a positive impulse reaches the base of the transistor 24, so that this transistor then becomes conductive and short circuits the capacitor 22. The output of the operation amplifier 20 thus once again acquires the reference potential. This process is repeated periodically, and the steepness with which the output potential of the operation amplifier increases will depend on the magnitude of the voltage difference between the two inputs of the operation amplifier, while the moment at which the output potential again begins to increase will depend on the frequency of the impulse generator 25.

If the output of the operation amplifier 20 is at reference voltage, then the transistors 26 and 27 are both blocked, since their emitters are also at the same reference voltage. As long as a higher voltage prevails at the non-inverting input of the operation amplifier 20 than at the inverting input, the potential at the output of the operation amplifier will steadily increase, from the reference potential upwards, after the short circuiting of the capacitor 22 has been nullified. As soon as the potential threshold is reached, at which a voltage sufficient to cause the transistors 26 and 27 to be driven hard prevails between the base and the emitters of these transistors, the transistor 26 will become conductive, and a negative impulse reaches the base of the transistor 30. This transistor 30 is likewise driven hard, and a current impulse will flow from the positive pole of the supply voltage, through the now conductive transistor 30 and through the diaphragm drive 1, to the reference potential. The duration of this current impulse is determined by the moment at which the transistor 26 becomes conductive and the moment at which the capacitor 22 is short circuited by the transistor 24.

As soon as the transistor 24 becomes conductive, to short circuit the capacitor 22, as a result of an impulse from the generator 25, the transistor 26 will be blocked and the current will likewise cease flowing through the transistor 30 and the diaphragm drive 1. This process is repeated until the voltage difference at the two inputs of the operation amplifier 20 has become zero.

Since the speed at which the output potential of the operation amplifier 20 increases depends on the magnitude of the voltage difference at the inputs of this amplifier, the potential threshold at which the transistor 26 becomes conductive will sooner or later be reached. In this manner, the exciter current impulses for the diaphragm drive will become shorter with decreasing voltage difference at the inputs of the operation amplifier 20, that is, with decreasing deviation of the actual diaphragm aperture from the nominal diaphragm aperture which would be correct for the prevailing light conditions. The scanning ratio of the exciter current pulse train, which is defined as the ratio of the duration of the impulse to the duration of the interval in which no impulse prevails, during one period of the pulse train, is modified in accordance with the signal taken from the photoelectric converter 2.

The same process is repeated in the reverse direction, when the voltage at the non-inverting input of the operation amplifier 20 is below the voltage at the inverting input connected to the nominal value setter 21. In this case, the output of the operation amplifier 20 is subjected to a voltage becoming continually more negative with respect to the reference voltage. If the potential of the output is lower than the reference potential by the ignition threshold of the transistors, then the transistor 27 will be driven hard. As a result, the transistor 31 becomes conductive, and a current impulse now flows from the reference voltage through the diaphragm drive 1 and through the transistor 31, to the negative pole of the voltage source, this flow through the electromagnetic coil of the diaphragm drive 1 being in a reverse direction as compared with the direction of flow previously described above. This process likewise is repeated periodically, so that the diaphragm drive is now subjected to an exciter current taking the form of an impulse of opposite polarity from that previously described. The diaphragm drive causes the diaphragm to move in a closing direction (aperture reducing direction) when the photoelectric cell 2 is connected up in the manner illustrated.

As a result of the impulse control system, the diaphragm drive will approach, at a relatively high speed, the balancing point at which it sets the diaphragm aperture to the correct value. Although a decreasing difference between the nominal and the actual value results in continually shorter time intervals during which the adjusting force prevails, there is nevertheless a danger that the diaphragm drive, owing to the inertia of its mass, will move beyond the balancing point and will have to be readjusted in the direction of the correct balancing point by a counter control system, that is, by means of current impulses of a different polarity. The diaphragm adjusting operation is thus greatly retarded, and an attempt has therefore been made to insure that the diaphragm drive will move asymptotically from one adjustment direction or the other to the correct balancing point.

In order to achieve this object, the RC element or member consisting of the resistor 32 and the capacitor 35 has been provided. In the capacitor 35 the voltage at the output of the operation amplifier 20 is integrated, and this capacitor voltage is conveyed through the resistor 36 to the inverting input of the operation amplifier 20. This reduces the voltage difference at the inputs of the operation amplifier 20, and in the immediate vicinity of the balancing point, there are no current impulses for the control of the diaphragm drive, although there is still a slight difference between the actual and the nominal value of the diaphragm aperture. Owing to the accelerated masses, however, the diaphragm drive will move asymptotically into the balancing point, without being actuated for this purpose.

With an initial considerable difference between the actual value and the nominal or theoretically correct value of the diaphragm aperture, the diaphragm drive will move toward the balancing point at a relatively high speed, owing to the long current impulses with which it is controlled. The voltage at the output of the operation amplifier 20, and thus the voltage in the capacitor 35 likewise, is accordingly considerable, so that the voltage difference at the inputs of the operation amplifier 20 will be reduced to a greater extent by the capacitor voltage. The control action exerted on the diaphragm drive will already be brought to a stop when this drive is still at a relatively great distance from its balancing point, and the drive will approach the balancing point asymptotically, owing to its speed. But with an initially slight deviation of the actual diaphragm aperture from the required nominal diaphragm aperture, the diaphragm drive will only be excited with short current impulses. The speed at which it approaches the balancing point will thus be considerably lower than in the first situation. Owing to the low voltage at the output of the operation amplifier 20, the voltage in the capacitor 35 is likewise much lower, and the reduction in the voltage differences at the inputs of the operation amplifier 20 is considerably smaller. Thus the diaphragm drive continues to be actuated until it has almost reached the balancing point, which it approaches asymptotically, at its low speed.

In order to insure that the capacitor 35 begins to measure the voltage at the output of the operation amplifier at the same moment at which the transistors 26 and 27 become conductive, and thus at the same moment at which the control impulses reach the diaphragm drive, the two parallel but oppositely faced diodes 33 and 34 are interposed between the capacitor 35 and the output of the operation amplifier 20. These do not become conductive until the same potential difference prevails between their anodes and their cathodes as that required by the transistors 26 and 27 to be driven hard. Hence the capacitor 35 accurately detects the beginning and the end of the current impulses. Considered as a whole, therefore, the RC elements 32 and 35 measure the speed at which the diaphragm moves toward its balancing point. Thus the control action exerted on the diaphragm drive is brought to a stop or is terminated at a certain distance, depending on the speed, before the balancing point is reached.

As already mentioned, the resistor 37 in parallel with the capacitor 35 serves to discharge the capacitor in such a way that the voltage of the capacitor 35 decreases in the same manner as the kinetic energy of the diaphragm drive system.

Figure 4:
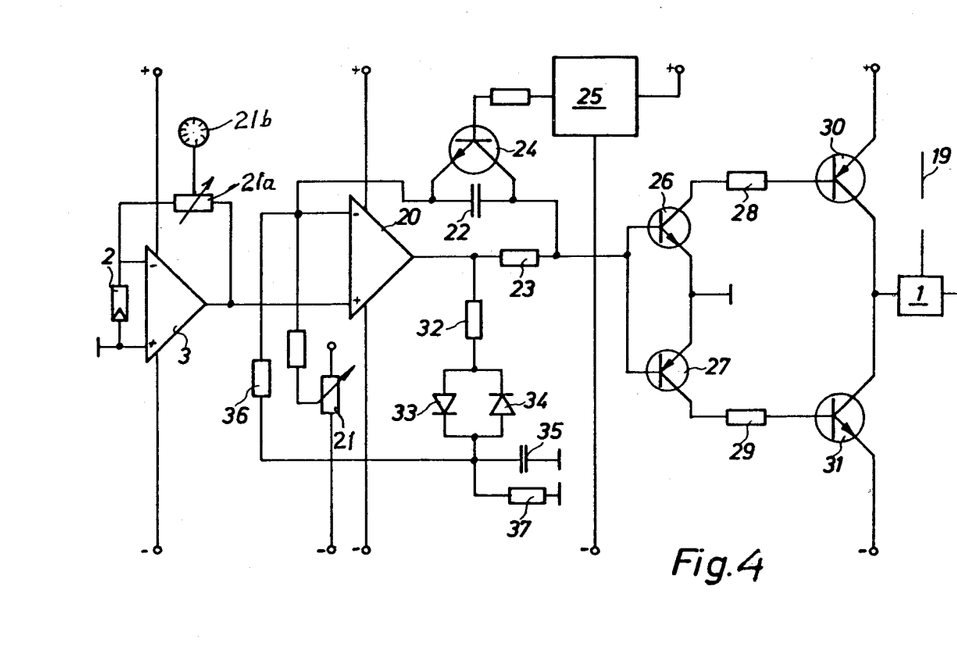
FIG. 4 is a view similar to FIG. 3, illustrating a modification.

In FIG. 4 there is shown a modification of and improvement upon the circuit previously described in connection with FIG. 3. It will be recalled that in FIG. 3, the member 21 is used for setting a nominal value such as the combined value of the film speed or sensitivity and a selected shutter speed or exposure time. In the modified circuit illustrated in FIG. 4, the variable resistor 21 is not used for this purpose, but is used only for the purpose of trimming or adjusting the circuitry for best performance, after which this variable resistor 21 remains set in its adjusted position, without further adjusting movement.

In this improved circuit, the nominal value representing film sensitivity and selected shutter speed is set by adjusting a variable resistor 21a in the feedback circuit from the output of the comparator or operational amplifier 3 to the inverting input of the element 3. The value of the variable resistor 21a is set by a knob or manual adjusting member 21b provided with a suitable graduated scale.

With this change in the location of the setting means for the film sensitivity and shutter speed, improved results are obtained. The operation of the control circuit is more sensitive, and less liable to errors at the upper and lower ranges, when the nominal value is set by means of a feedback circuit from the output of the comparator or operational amplifier to the inverting input thereof, and such an improvement is possible not only with respect to the circuit of the general form of FIG. 3 (as shown specifically in FIG. 4) but also with respect to the circuit of FIG. 2 and the generic circuit of FIG. 1. In FIG. 2, for example, the resistor in the feedback circuit from the output of the element 3 to the negative or inverting input thereof can be made a variable resistor for introducing the film sensitivity and shutter speed, just as in the case of FIG. 4. In FIG. 1, the variable resistor for setting film sensitivity and shutter speed can be put in a feedback circuit from the output of the element 3 to the inverting input of the same element, thus enabling the elimination of the elements 5, 6, and 7 in FIG. 1.

One reason for the improved results obtained by this change in location of the setting means, is that the operational amplifier (e.g., 12 in FIG. 2, or 20 in FIGS. 3 and 4) is now subjected to a smaller range of input voltage changes, and can operate more accurately within this limited range, than was possible when the amplifier had to operate throughout a greater range, when the setting means (for film sensitivity and shutter speed) was placed in the original location illustrated in FIGS. 2 and 3. This follows from the fact that, in the new location of the setting means, the product of the resistance through the setting resistor (e.g., 21a) times the current flowing through the photoconverter is substantially a constant when the diaphragm is at its balance point, hence the voltage output of the amplifier 3 applied to the operational amplifier 20 is likewise a constant (at the balance point of the diaphragm), so the value of the resistance may be so dimensioned that, at the balance point of the diaphragm, the input voltage to the operational amplifier is at a value where the amplifier exhibits the best operational characteristics.

What is claimed is:

1. Control means for controlling an adjustable aperture of a diaphragm of a photographic camers, said control means comprising electromagnetic diaphragm drive means, a photoelectric converter situated behind said diaphragm in position to receive light through the aperture of said diaphragm, exciter current supply means responsive in part to current from said photoelectric converter for supplying a succession of exciter pulses to said electromagnetic drive means to cause movement of said drive means to adjust said diaphragm to a different aperture, said exciter current supply means including an operation amplifier having two inputs and an output, a control stage, means for supplying an output from said photoelectric converter to an input of said amplifier, nominal value setting means operatively connected to influence voltage supplied to one input of said amplifier, a feedback circuit from the output of said amplifier to one input thereof, an operative connection from the output of said amplifier to an input of said control stage, and an operative connection from an output of said control stage to said electromagnetic drive means.

2. The invention defined in claim 1, wherein said means for supplying exciter pulses produces a succession of pulses of alternating polarity during adjustment of the diaphragm aperture in a single direction.

3. The invention defined in claim 1, wherein said means for supplying exciter pulses produces a succession of pulses all of the same polarity during adjustment of the diaphragm aperture in a single direction.

4. The invention defined in claim 3, wherein the exciter pulses are of a first polarity during adjustment of said aperture in one direction and of a second polarity during adjustment of said aperture in an opposite direction.

5. The invention defined in claim 3, wherein said exciter current supply means includes means furnishing a source of supply voltage having an upper potential, a lower potential, and an intermediate reference potential, and wherein there is a capacitor (22) in said feedback circuit, further including a transistor (24) in parallel with said capacitor (22) in said feedback circuit, and an impulse generator (25) for periodically rendering said transistor (24) conductive.

6. The invention defined in claim 5, further including voltage reducing means for reducing a difference in voltage between the two inputs of said operation amplifier (20), said reducing means including an RC circuit for integrating an output voltage of said amplifier (20) during a diaphragm aperture adjustment phase, said RC circuit having a resistor (32) and a capacitor (35) in series with each other and operatively connected between the output of said amplifier (20) and said source of intermediate reference potential, and an operative connection from a point between said resistor (32) and said capacitor (35) to one of the inputs of said amplifier (20).

7. The invention defined in claim 6, further comprising two diodes (33, 34) connected in parallel with each other and conductive in opposite directions and interposed between said capacitor (35) and the output of said amplifier (20), and a resistor (37) in parallel with said capacitor (35).

8. A control system for adjusting the diaphragm aperture of a photographic camera having an electromagnetic diaphragm drive, a control stage for energizing said electromagnetic drive, nominal value setting means, and a photoelectric converter situated to receive light passing through said diaphragm aperture, said control system comprising:
(a) an operational amplifier for receiving a reference input and an input from said photoelectric converter;
(b) means for varying one of said inputs as a function of a value set by said nominal value setting means;
(c) a feedback circuit arranged relative to said operational amplifier for shaping the output of said operational amplifier as substantially constant frequency pulses modulated in duration by the comparison made between said reference input and said photoelectric converter input; and
(d) means for inputting said duration-modulated pulses to said control stage for driving said electromagnetic drive to adjust said diaphragm aperture.

9. The control system of claim 8 wherein said nominal value setting means is operatively connected to said reference input.

10. The control system of claim 8 wherein said feedback circuit includes an RC circuit forming said pulses in alternating polarity during adjustment of said diaphragm aperture in a single direction.

11. The control system of claim 10 wherein said output from said operational amplifier (12) is connected with said control stage (17 and 18) for said diaphragm drive (1) and said feedback circuitry includes resistors (15 and 16) and a capacitor (13) interposed between said photoelectric converter input of said operational amplifier and a reference potential between the upper and lower potentials of a supply voltage for said system.

12. The control system of claim 8 wherein said feedback circuit includes a capacitor, a constant frequency pulse generator, and circuitry responsive to pulses from said generator for forming said output pulses from said operational amplifier all of the same polarity during adjustment of said diaphragm aperture in a single direction.

13. The control system of claim 12 wherein said output pulses from said operational amplifier have a first polarity during adjustment of said diaphragm aperture in one direction, and a second polarity during adjustment of said diaphragm aperture in an opposite direction.

14. The control system of claim 12 wherein said output from said operational amplifier is connected with said control stage for said diaphragm drive, and said feedback circuitry includes a capacitor interposed between said output and the inverting input of said operational amplifier and arranged to be periodically short-circuited.

15. The control system of claim 14 wherein a transistor (24) bridges said capacitor (22), and said pulse generator (25) actuates said transistor (24).

16. The control system of claim 15 including a feedback circuit for integrating said output pulses from said operational amplifier and applying said integrated output pulses to said reference input of said operational amplifier for reducing the voltage differences at said inputs to said operational amplifier.

17. The control system of claim 16 wherein said integrating circuitry includes a resistor (32) and a capacitor (35) connected between said output of said operational amplifier and a reference voltage between the upper and lower potential of a supply voltage for said system, and means for connecting said reference input of said operational amplifier (20) with a junction between said resistor (32) and said capacitor (35).

18. The control system of claim 17 including two diodes (33 and 34) connected in parallel and opposite directions between said output from said operational amplifier (20) and said capacitor (35).

19. The control system of claim 18, further including a resistor (37) connected in parallel with said capacitor (35).

20. The control system of claim 8 wherein said nominal value setting means is operatively connected to said photoelectric converter input.

21. The control system of claim 20 wherein said photoelectric converter input includes another operational amplifier, and said nominal value setting means includes a variable resistor connected between the output of said other operational amplifier and the inverting input of said other operational amplifier.

22. The control system of claim 21 wherein the resistance value of said variable resistor is selected so that the product of the current in said photoelectric converter and said resistance value is constant at the balance point of said diaphragm aperture.

23. A control system for adjusting the diaphragm aperture of a photographic camera having an electromagnetic drive, a photoelectric converter situated to receive light passing through said diaphragm aperture, and circuitry responsive to said photoelectric converter for energizing said electromagnetic drive, said control system comprising:
 (a) an operational amplifier;
 (b) the output from said photoelectric converter being applied to an input of said operational amplifier;
 (c) a variable resistor connected between the output of said operational amplifier and an input to said operational amplifier;
 (d) said output of said operational amplifier being connected to said energizing circuitry; and
 (e) said resistor being varied as a function of exposure time and film speed.

24. The control system of claim 23 wherein the resistance value of said variable resistor is selected so that the product of the current in said photoelectric converter and said resistance value is constant at the balance point of said diaphragm aperture.

* * * * *